(12) United States Patent
Skinger (10) Patent No.: US 8,118,294 B2
(45) Date of Patent: Feb. 21, 2012

(54) VALIDATION OF MAILPIECE COMPOSITION COMPLETENESS

(75) Inventor: Gregory P. Skinger, Southbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 291 days.

(21) Appl. No.: 12/578,312

(22) Filed: Oct. 13, 2009

(65) Prior Publication Data

US 2011/0084437 A1   Apr. 14, 2011

(51) Int. Cl.
*B65H 43/06* (2006.01)
(52) U.S. Cl. ............ 270/52.02; 270/52.04; 270/52.06
(58) Field of Classification Search ........... 270/52.02, 270/52.04, 52.06
See application file for complete search history.

(56) References Cited

U.S. PATENT DOCUMENTS

| | | | | |
|---|---|---|---|---|
| 4,218,612 A | * | 8/1980 | Krehl et al. | 235/449 |
| 4,752,684 A | * | 6/1988 | Herrmann | 250/302 |
| 6,249,716 B1 | * | 6/2001 | Edens et al. | 700/222 |
| 6,519,503 B2 | * | 2/2003 | Paterson et al. | 700/226 |
| 7,272,466 B2 | * | 9/2007 | Graushar et al. | 700/227 |
| 2008/0296312 A1 | | 12/2008 | Gibb et al. | |

* cited by examiner

*Primary Examiner* — Leslie A. Nicholson, III
(74) *Attorney, Agent, or Firm* — Brian A. Collins; Charles R. Malandra, Jr.; Steven J. Shapiro (57) ABSTRACT

A method and system for validating the completeness of a document collation includes obtaining information concerning a document having a first page and a last page, and processing the obtained information. The processed information is employed to apply a marking on the document that may be readable through an enclosure that visually obscures the marking. The marking may provide information regarding the completeness of the document collation within the enclosure. The processed information may be employed in a manner such that the applied marking includes a first page mark on the first page of the document collation and a last page mark in the last page of the document collation. The marks may be applied in respective predetermined zones on the first page and the last page. The first page zone and the last page zone may have a predetermined relationship for a document collation.

18 Claims, 5 Drawing Sheets

VALIDATION OF MAILPIECE COMPOSITION COMPLETENESS

FIELD OF THE INVENTION

The invention disclosed herein relates generally to validation of mailpiece composition completeness and, more particularly, to a system and method for validating the completeness of the contents of mailpieces after the mailpiece content has been inserted into an envelope.

BACKGROUND OF THE INVENTION

Errors can occur while processing a set of document pages into finished mailpieces. Certain types of these errors can result in the finished mailpieces not containing the correct set of document pages. For example, an incorrectly assembled mailpiece may also contain the last page of the previous mailpiece or the system may incorrectly identify a completed mailpiece as the previous mailpiece. In such case, the previous mailpiece document collation would be missing the last page and would be incomplete. The incorrectly assembled mailpiece would contain the last page from the previous mailpiece document collation, as well as the first page and possibly the last page of the intended document collation. Both of these mailpieces would be defective because each lacks the intended document collation contents.

While the vast majority of these errors can be detected through normal material tracking in paper handling equipment, errors in the paper handling equipment tracking logic implementation or material movement may be undetected by the tracking sensors. In such cases, a mailpiece could be processed incorrectly, yet be identified by the paper handling equipment system as being correct.

There are methods of validating the correct assembly of finished mailpieces, each with its own limitations. These include weighing, scanning, and measuring the thickness of the finished piece. There are also methods of insuring that the correct addressee on a sealed envelope matches the address printed on the envelope by marking the document with the addressee name or designation so that it can be read through the closed-face envelope or other container.

Scanning the finished mailpiece does not work on closed-face envelopes and other packaging and also may not work on windowed envelopes if the material within the envelope is not positioned accurately within the window, or shifts after being positioned accurately.

Weighing of a mailpiece requires calibration and does detect a data shift between mailpieces if all or some mailpieces within the job contain the same number of input documents, that is, document collation pages and enclosures are the same in number or otherwise weigh the same.

Finally, thickness detection has similar limitations as weighing and also cannot work on high page count documents such as high-count, non-folded documents because the tolerance of the document thickness may exceed the thickness of a single sheet. Moreover, insuring that the addressee on the contents matches the printed address on the envelope or container does not insure that the proper complete contents are enclosed in the finished mailpiece.

SUMMARY OF EXEMPLARY ASPECTS

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

According to embodiments of the present invention, a document collation may be marked in a manner such that after the document collation is enclosed within an envelope or other enclosure that obscures the document collation marking, the presence of the complete document collation within the envelope or enclosure may be validated. The marking may be readable through an envelope and may provide information regarding the completeness of the document collation.

The system may provide an independent way to help ensure the completeness of the document collation that does not rely on the proper operation of the paper handling equipment that assembles, processes, and inserts a document collation and enclosures into an envelope or other enclosure. Assurance may be provided by embodiments of the present invention, for example, that a document collation within an envelope contains only one first page and only one last page. Moreover, assurances may also be provided by embodiments of the present invention that the correct number of pages are in the document collation, as are the proper enclosures, and even that each page of the document collation has the same and correct piece numbers for the mailpiece.

In accordance with the purpose of the invention, as embodied and broadly described herein, one aspect of the invention relates to a method for validating the completeness of a document collation comprising obtaining information concerning a document having a first page and a last page and processing the obtained information. The processed information may be employed to apply a marking on the document. The marking is readable through an enclosure that visually obscures the marking, and may provide information regarding the completeness of the document collation through the enclosure.

In some embodiments, the method may further comprise employing the processed information in a manner such that the applied marking includes a first page mark on the first page of the document collation and a last page mark in the last page of the document collation.

In other embodiments, the method may further comprise applying the mark to the document collation so that the first page mark located within a predetermined first page mark zone on the document collation and the last page mark is located within a predetermined last page mark zone on the document collation.

In another aspect, the invention relates to a system for validating the completeness of a document collation having a first page and a last page, comprising a scanner for scanning document pages of a document collation and obtaining information from visible markings on the document pages concerning the document collation. A processor may be connected to the scanner and be operable to process obtained information from the visible markings to encode the information for printing on the document collation in a magnetic ink. In one embodiment, a magnetic ink printer is connected to the processor and is operable to print encoded information on the document collation.

Insertion processing equipment may be connected to receive the document collation with the encoded printed information for inserting into an envelope. A magnetic ink scanner may be connected to receive and operable to scan envelopes having inserted document collation with the encoded printed information to retrieve the encoded information printed on the document collation. In one embodiment, a scan decode processor is connected to the magnetic ink scanner and is operable to decode the encoded information to determine if the document collation within the envelope contains a complete document collation.

Aside from the structural and procedural arrangements set forth above, the invention could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this specification, illustrate exemplary embodiments of the invention and, together with the description, serve to explain the principles of the invention. In the drawings.

DETAILED DESCRIPTION OF EXEMPLARY EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1:
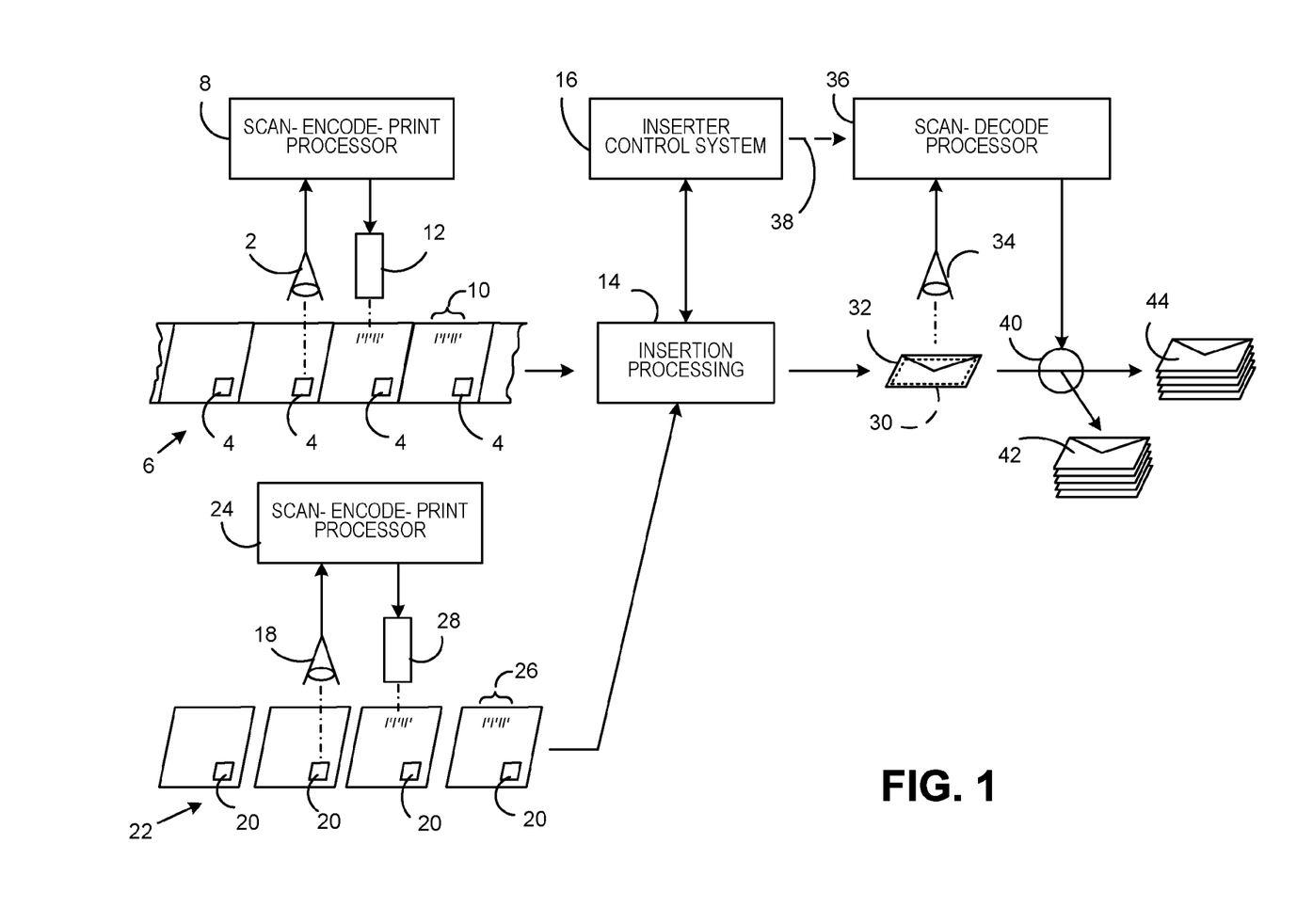
FIG. 1 is a schematic view of an embodiment of a mailpiece validation system embodying the present invention and operating in accordance with the flow charts shown in FIGS. 2 and 3.

A scanner 2, shown in FIG. 1, scans regions 4 of each sheet of a continuous web of sheets, shown generally as 6. The region 4 on each of the sheets contains a code, such as a barcode, OCR code, or OMR code, for example, which indicates the piece identification number of the document collation to which the sheet belongs and the sequence of the sheet within that document collation. This information may be contained explicitly in the code or retrieved from a file or database to which the code (a pointer) indexes.

The piece identifier shown in the various figures is a piece identification number. However, the piece identifier and piece identification number, as used herein may be any type of identifier such as letters, numbers, and/or symbols. The piece identifier may be a sequence designation for each document collation in a series of document collations, a document collation identifier, and/or mailpiece identification number. Moreover, relationships can exist and be tracked, as for example, a sequence number designation and a mailpiece identification number. Additionally, the piece identifier, i.e., piece identification number, may be a portion of a complete identifier such as the last six digits of a mailpiece identification number, for example.

In a typical application, a barcode is printed in region 4 on the document pages in a visible format. This barcode will often contain such information as the piece identification number and the page number. Once the piece identification number and page number have been determined, by either decoding the symbol preprinted on the page or by other means, such as look up in a file, a representation of this information is printed onto the pages using magnetic ink or other means such as from an inkjet printer. This information may be applied either as part of the printing of the document pages or just prior to processing on the inserter processing system.

Figure 5:
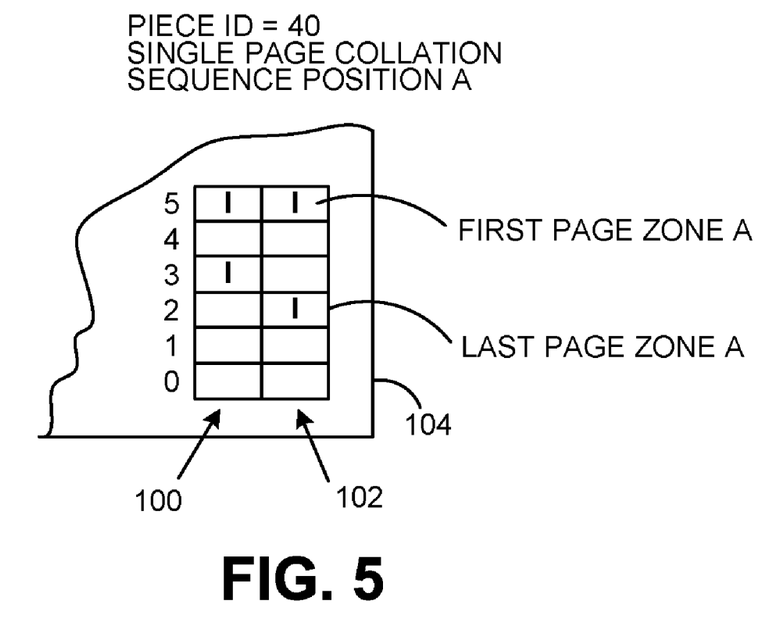
FIG. 5 is a schematic view of a representation of the coding arrangement shown in FIG. 4 illustrating the validation code for a single page document collation.
Figure 6:
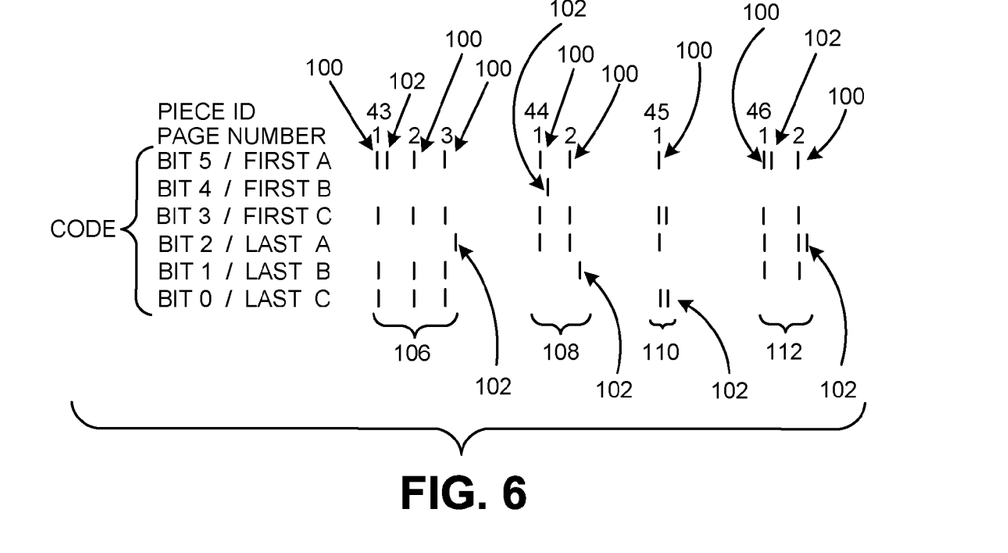
FIG. 6 is a chart showing representations of the coding arrangement shown in FIG. 4, illustrating the validation codes for four sequential document collations with the collations having different numbers of pages; and, FIG. 7 is a chart showing representations of the coding arrangement shown in FIG. 4 for four sequential document collations with the collations having different numbers of pages and including two additional sequence bits employed in an alternating pattern for adjacent document collations.
Figure 7:
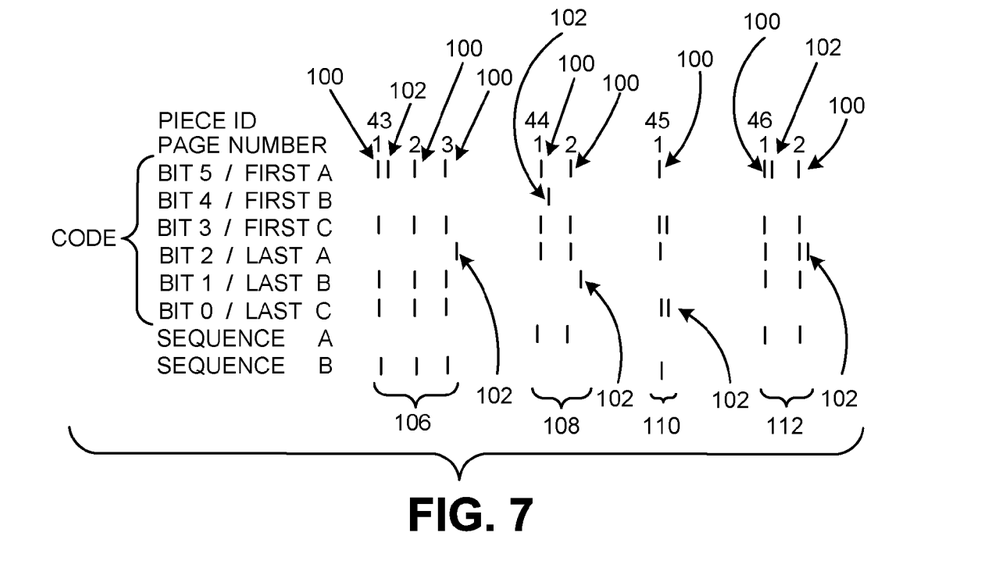

A scan-encode-print processor 8 encodes a representation of the document collation piece identifier, which is a piece identification number, as shown in the FIGS. 5-7, and an indication of the first sheet and the last sheet within the document collation into a mark, e.g., a validation symbol, for the pages of the document collation. A mark 10 is shown on one of the sheets in FIG. 1. In the illustrated embodiment, the mark 10 is printed with a magnetic ink on the sheet by a printer 12. The magnetic ink printing of the piece identification number is on each sheet of each document collation. Further, a first page validation symbol is printed on the first page of the document collation and a last page validation symbol is printed on the last page of the document collation.

The magnetic ink printing is readable by a magnetic ink scanner even when the printing is obscured by an envelope or other type of enclosure. In one embodiment, the piece identification number and first and last page identifiers may be applied to the pages in region 4 when the document collation pages are printed, prior to the processing on the inserter. In other embodiments, the piece identification number and first page and last page identifiers can be printed at a later point in time.

The first page validation symbol and the last page validation symbol are printed in predetermined zones, i.e., locations, on the document pages. The zones change for the first page and for the last page of adjacent document collations in a series of collations being assembled and processed. The zones and changing zones for adjacent collations are hereinafter described in detail in connection with FIGS. 4-7. It should be noted that the document collation processed by the inserter 12 may be a single-sheet or multiple-sheet collation. In the case of a single-sheet collation, the first page of the collation and the last page of the collation are the same single sheet.

Instead of employing magnetic ink printing, other forms of marking each collation with a validation symbol may be employed, provided such marking is readable even when the marking is obscured by an envelope or other type of enclosure. Examples of such other types of marking include radio frequency identification (RFID) tags on the document collations to provide validation indication for the various document collations. Other technologies may also be used by which information can be encoded and later read via non-optical means. Regardless of the methods and technology employed, once the mailpiece (or enclosure) has been completely processed, the contents of the marking, i.e., validation symbol, are read to determine that the encoded piece identification or other encoded information, as hereinafter described, matches or corresponds to the expected value and that the correct first and last pages, as well as the appropriate enclosures, are included in the mailpiece.

Embodiments of the system may allow processing of both file-based and direct scan jobs, any number of input documents and fold types, and both windowed and closed-faced envelopes. File-based jobs are arrangements where instructions for assembling the collation and the enclosures are in a file, and the code on the document contains a pointer to the location within the file that contains the information required to encode the validation codes onto the documents and enclosures. In direct scan jobs, all of the processing instructions are contained in the scan code preprinted on the document, and the instructions contain the information for the printing of the magnetic codes on the documents and enclosures.

After the sheets are printed with the magnetic ink validation marks, the sheets are processed on insertion processing equipment 14, which is controlled by an inserter control system 16. The processing may include cutting the accumulated sheets, accumulating them into document collations, folding, merging enclosures with the document collation, inserting the document collation and any enclosures into an envelope, and sealing the envelope to form a finished mailpiece.

Enclosures to be made part of a finished mailpiece may be moved into the insertion processing equipment 14 with validation marks in a manner similar to that employed with document collations. Thus, a scanner 18 scans a region 20 of each enclosure of a series of enclosures, shown generally as 22. The region 20 may contain a code, such as a barcode, OCR code or OMR code, for example, which indicates information about the specific enclosure that is to be associated with the collation within the insertion processing equipment 14. This information, as is the case with document collations, may be contained explicitly in the code 20 or may be retrieved from a file to which the code indexes.

A scan-encode-print processor 24 encodes a representation of the information from the enclosure and any other information that may be pertinent to the nature and number of the enclosures to be associated and included with a given collation in the insertion processing equipment 14. This validation information 26 is printed with magnetic ink on the enclosure by a printer 28.

Each sealed envelope containing a document collation, such as document collation 30 within envelope 32, is scanned by a magnetic ink scanner 34. A scan-decode processor 36 decodes the validation symbol on the document collation and also on any enclosure and validates that there is only one first page and only one last page contained in the document collation and obtains any information regarding the enclosures.

If desired, the system may be organized to compare the piece identification number information provided by the inserter control system 16 via a data communication link 38 with the piece identification number retrieved from the document collation by the magnetic ink scanner 34 and the scan-decode processor 36. This provided information should match or correspond to the retrieved information. If the validation symbol contains an invalid first and last piece indication, or the encoded retrieved piece identification does not match or correspond to piece number provided by the inserter control system 16, then the scan-decoder processor 36 may activate a diverter 40 to out sort the mailpiece into a location 42 for other action, such as manual inspection and correction. All validated mailpieces proceed to location 44.

By marking the first and last page of a document collation the system for validating the completeness of a mailpiece provides an independent detection mechanism that is not dependent on the proper operation of the insertion processing 14 and the inserter control system 36 where, for example, the first and last sheets of two adjacent collations may be mixed up. This is a possible failure mode for insertion and other paper handling equipment with the last page of one document collation merging with the next collation.

If this occurs, the system for validating the completeness of the mailpiece detects the error. The improperly assembled document collation within an envelope is diverted by diverter 40 to location 42 and thereby out sorted. The expected contents, if desired, may be printed on the outside of the envelope, scanned, and compared with the detected contents within the envelope to determine if the expected contents match or correspond to the detected contents. In any case, if the detected contents match or correspond with the expected contents, the mailpiece is deemed validated. If the detected contents do not match or correspond with the expected contents of the mailpiece, the mailpiece is not deemed validated and the mailpiece may be out sorted by diverter 40 and subject to further processing.

Figure 2:
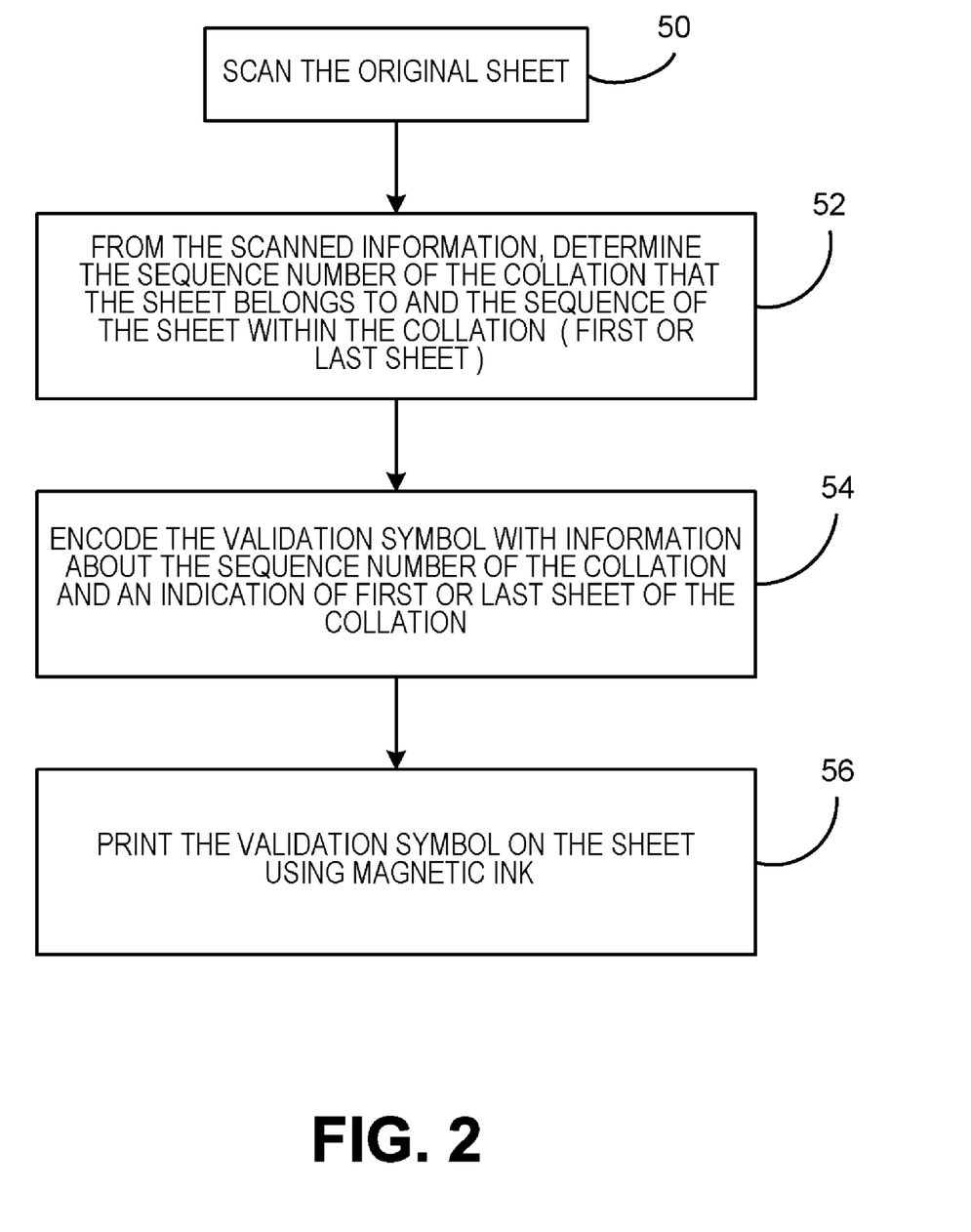
FIG. 2 is a flow chart of the operation of the system shown in FIG. 1 relating to the printing logic for each sheet.

Reference is now made to FIG. 2, which is a flow chart of the operation of the system shown in FIG. 1 relating to the printing logic for each sheet of a document collation. An original sheet is scanned at block 50. At block 52 the piece identification number of the collation that the sheet belongs to and the sequence of the sheet within the collation (i.e., first or last sheet) is determined from the scanned information. At block 54 the validation symbol for the collation is encoded with information about the piece identification number of the collation and an indication of first or last sheet of the collation. At block 56, the validation symbol is printed or marked on the sheet using magnetic ink or other technology that can be subsequently detected through an enclosure.

Figure 3:
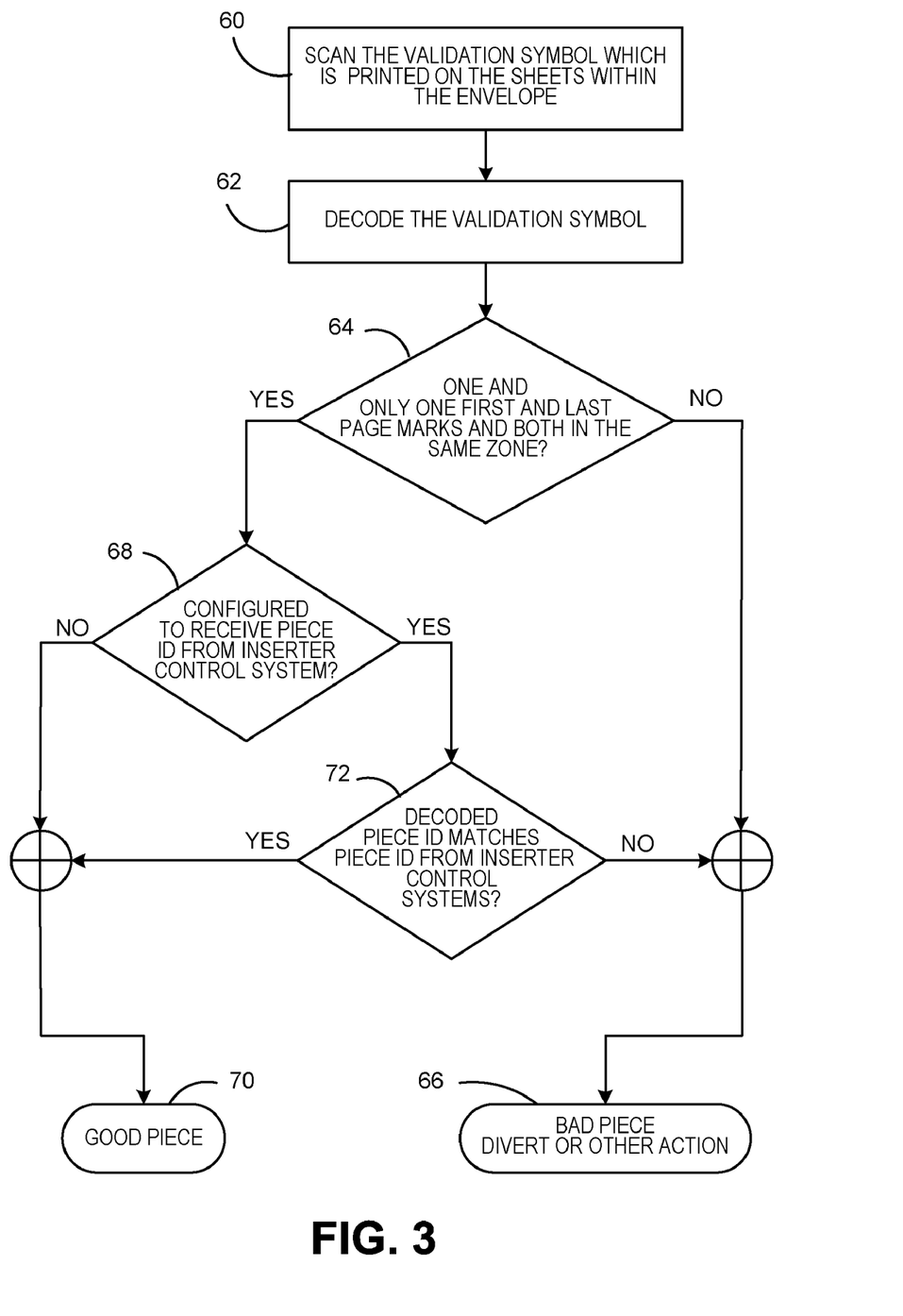
FIG. 3 is a flow chart of the operation of the system shown in FIG. 1 relating to the scanning logic for each finished mailpiece.

Reference is now made to FIG. 3, which is a flow chart of the operation of the system shown in FIG. 1 relating to the scanning logic for each finished mailpiece. At block 60 the validation symbol, which is printed on the sheets within an envelope, is scanned and the validation symbol is decoded at block 62. A determination is made at decision block 64 if only one first and last page mark are present and both are in the same zone. In particular, it is determined whether the predetermined zone for the first page of the document collation has the predetermined relationship to the zone for the last page of the document collation. If this is not the case, the mailpiece is diverted as a bad mailpiece or other action at block 66, such as manual inspection and correction.

Where a determination is made that only one first and last page mark are present on the document collation and both are in the same zone, a further determination is made at block 68 as to whether the system is configured to receive a piece identification from the inserter control system. Where this is not the case, the system is processed as a good mailpiece at block 70, since no further information is available about the specific document collation.

Where, however, the system for validating the completeness of a mailpiece is configured to receive piece identification form the inserter control system, the process continues at decision block 72 for further processing. A determination is made at decision block 72 if the decoded piece identification matches the piece identification from the inserter control system. Where this is the case, the process continues at block 70, having validated the mailpiece as a good piece. Where this is not the case, the process continues at block 66, where the mailpiece has been diverted as bad or for other action.

Figure 4:
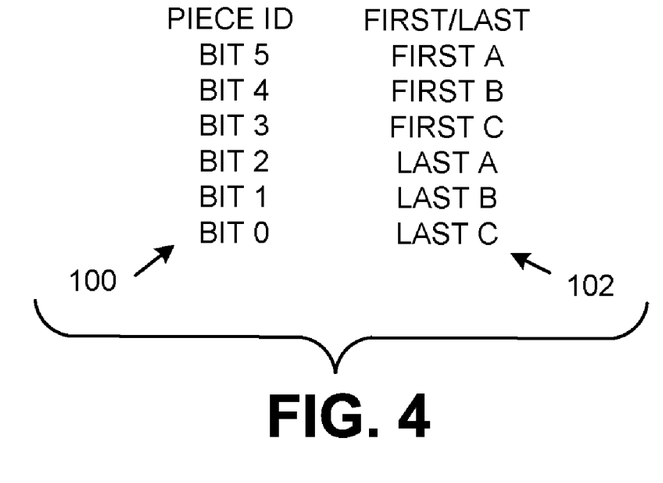
FIG. 4 is a chart showing a representation of a coding arrangement that may be employed with the system shown in FIG. 1 to provide validation coding for document collations to be included as part of a finished mailpiece.

Reference is now made to FIG. 4, which is a chart showing a representation of a coding arrangement that may be employed with the system shown in FIG. 1 to provide validation coding for document collations to be included as part of a finished mailpiece. As previously noted, each collation within a finished mailpiece includes a piece identifier and a first page and a last page indicator.

The coding system shown in FIGS. 4-7 includes six bits (0-5) in field 100 and in field 102, three zones (A, B, and C) for a first page designation, and three zones (A, B, and C) for a last page designation. The six bits in field 100 represent the least significant six bits of the piece ID. The field 100 information is printed in magnetic ink on predetermined locations within areas on each sheet of a collation. The field 102 information is printed in magnetic ink in predetermined zones only on the first and last sheet of a document collation.

The first and last page zones for a document collation have a predetermined relationship and are both noted with the same letter designation A, B, or C. Zone A is the location that is the position in field 102 where the first page designation is printed adjacent to Bit 5 in field 100, while the last page designation for zone A is the position in field 102 on the last page of the document collation adjacent to Bit 2 in field 100.

In like manner the first page designation in zone B is the location in field 102 adjacent to Bit 4, while the last page designation in zone B is the position in field 102 adjacent to Bit 1 in field 100. Finally the first page zone C location is in field 102 adjacent to Bit 3 of in field 100 and the last page of zone C designation is the position in field 102 adjacent to Bit 0 in the field 100.

Reference is now made to FIG. 5, which illustrates how the piece identification number and first page and last page identification are printed for the validation information in magnetic ink on a collation involving a single page. The piece identification for the single page document 104 is piece identification 40.

For ease in visualization, the bit numbers are indicated adjacent to field 100 and grid lines are shown encompassing fields 100 and 102 for the various areas on the document where the marks would be printed in magnetic ink. Usually, however, neither the bit number indicators nor the grid lines would be printed on the document. However, a magnetic locating indicator, not shown, may be printed to facilitate locating the information for detection by the magnetic ink scanner 34.

As can be seen in FIG. 5, the bit locations for Bit 5 and Bit 3 are shown as active, by a dash mark printed by the magnetic ink printer, to provide a binary designation for the piece identification 40. In field 102, adjacent to Bit location 5 of the mailpiece identification number field 100, the first page zone A is shown as active by a dash mark. The zone A is the area or location in which the first page indication is made. Similarly, in field 102 adjacent to Bit 2 in field 100 the last page indication is made active and this printed dash mark is the last page zone A location.

In a manner similar to that described above, the zone B for the first page is adjacent to Bit 4 and the last page of zone B is adjacent to Bit 1. The first page zone C is adjacent to Bit 3 and the last page zone C is adjacent to Bit 0. These first page and last page zones B and C are not active and, thus, do not contain a printed dash mark. The zones may be rotated and repeated for non-adjacent documents or collations.

The particular number of zones shown in FIGS. 4-7 are three zones: zone A, zone B, and zone C. The number of zones can be larger so the reuse of a zone has a greater separation between sequentially processed documents. For example, ten or fifteen zones may be employed. Other numbers of zones may also be used and may depend on factors, such as the size of the zone, the size of the medium, the nature of the printing apparatus and the ink used to print the codes, and the sensitivity of the apparatus for reading the codes.

The zones may be printed on the front or the back of each document page and may also be arranged with codes identifying not only the first and last page of each collation, but each specific page of each document and each enclosure. Moreover, if the marking with which the code is implemented is invisible to the human eye, the validation code can be implemented over printed material and on different areas of each document page, thereby increasing the area on the document pages available for zones. The selection of the encoding scheme is a tradeoff between robustness to detect multiple document assembly errors and the space on the document allocated to for printing the validation code marks.

Reference is now made to FIG. 6, illustrating the validation codes for sequential documents 106, 108, 110, and 112. Document 106, with piece identification number 43, is a three-page document. Document 108, with piece identification number 44, is a two-page document. Document 110, with a piece identification number 45, is a single sheet document. Document 112, with a piece identification number 46, is a two-page document.

The least significant six bits of the respective piece identification number are printed in binary format in field 100 with dash marks on each of each of documents 106 through 112. This provides the ability in most instances to determine that all of the pages in the collation belong to the specific collation and mailpiece being validated.

In field 102 the first page of each document collation is marked with the first page designation. Thus, the first page of document 106 is marked active in the first page zone A, the first page of document 108 is marked active in the first page zone B, and the first page of document 110 is marked active in the first page zone C. The first page zone designation sequence rotates and repeats with the first page of document 112 marked active in first page zone A.

With respect to the last page designation for each of the documents 106 through 112, the last page of document 106 is marked active in the last page zone A, the last page of document 108 is marked active last page zone B, and the last page of document 110 is marked active in the last page zone C. The last page zone sequence rotates and repeats with the last page of document 112 marked active in last page zone A.

It is possible to code each page of a collation rather than merely the first page and last page of the collation. In such a case, the piece identification number and the specific pages of the collation could be validated in a manner similar to that previously described. However, scanning and decoding the magnetic printing of document collation piece identification numbers in a binary format may provide a false document collation piece identification number.

This would be the case, for example, if a first page and a last page of certain specific document collations merge with specific binary numbers such as a document 106 with piece identification 43, as shown in FIG. 6, and a previous document collation, not shown, with a piece identification number of 42. This is because the scanning of the binary representation of the specific magnetic printed piece identification would be unable to discriminate between these two specific binary number representations because the presence of the extra active bit in piece identification number 43 would be a valid piece identification number, even if a page with a piece identification number 42 was present.

Nevertheless, even in such situations, there would be no validation of the mailpiece completeness if the first page and a last page of the collation did not properly match. Thus, the envelope containing such a document collation would be diverted by the diverter 40 into the location 42, even if the improper mailpiece identification number was not detected.

Reference is now made to FIG. 7, which illustrates an enhancement to the coding arrangement shown in FIGS. 4, 5, and 6, with the addition of two sequence bits in field 100 (i.e., the piece identification number field). This further enhances the arrangement described above, where each page of a collation is coded. It could also be employed without coding each and every page of a collation.

The Sequence Bit A and Sequence Bit B for each sequential document collation is marked in an alternating pattern of active and inactive. Thus, the Sequence A Bit is not marked active for document 106, but the Sequence B Bit is marked active by a printed magnetic ink dash mark.

An alternating pattern is employed for document 108, wherein the Sequence A Bit is marked as active by a printed magnetic ink dash mark and the Sequence B Bit is not marked as active. Again, alternating the pattern for document 110, Sequence A Bit is not marked as active and Sequence Bit B is marked as active by a printed magnetic ink dash mark. For document 112, the Sequence A Bit is marked as active by a printed magnetic ink dash mark and Sequence B Bit is not marked as active.

By employing Sequence A and Sequence B Bits marked in an alternating pattern, for any adjacent document collations that become intermixed, Sequence A and Sequence B would both appear to be marked active when the mailpiece is validated, and thus the intermixing of adjacent collations, e.g., an overlap, would be detected by the scan-decode-processor 36. Accordingly, if the magnetic ink scanner 32 detects an active Sequence A bit and an active Sequence B bit for any document collation within a finished mailpiece, the scan-decode-processor 36 would cause the diverter 40 to divert such mailpiece to location 44 as a mailpiece which has not been validated and in need of further processing.

As described above, once a mailpiece has been assembled and sealed inside the envelope, the mailpiece is passed under the magnetic code sensor that detects the presence or absence of the printed bars in field 100 and field 102. The decoded values of these bars are used to determine the piece identification and the first and the last page of the document collation information in order to validate that the document collation for the mailpiece was assembled correctly. The piece identification is compared to the expected mailpiece identification where the system is so organized.

If the decoded sensed values do not match or correspond with the expected value, the mailpiece is deemed not validated or bad and removed from the mail stream. Also, the first and last page decoded information is interpreted to ensure that the mailpiece contains only one first page and only one last page and that they are the correct first and last page, based on the magnetic printed bars being in the correct zones for that mailpiece.

As described above, if the decoded sensed value does not agree with the expected value, then the mailpiece is marked as bad and removed from the mail stream. The scan-decode-processor 34 determines for each document collation that the first page validation symbol and the last page validation symbol are in the same zone, such as zone A for the document 104 shown in FIG. 5. The system for validating the completeness of a mailpiece may also, when so organized, determine from the scanned document collation data that the document collation piece identification matches or corresponds to the information provided from the insertion process. Embodiments of the system may also determine that the detected first page and last page zone are in the collation, that the collation has the correct number of pages and the proper enclosures, and even that each page of the document collation has the same piece number.

It should be recognized that many variations may be made to the system embodying the invention and that the invention is applicable to areas other than mailpieces. For example, prescription medicines are often sent to recipients with descriptive material concerning the medication, including dosage, usage, and contraindications, for example. In those cases, the materials enclosed with the medication should be correct and complete and ensure that the recipient of the medication is correct for the particular medication. Embodiments of the present validation system can be used to validate that the correct, complete contents are contained within the enclosed package, such as a mailer, for example.

Moreover, various alternative coding arrangements may be employed. For example, the coding arrangement may be other than a binary coding arrangement and may be coded using error correction schemes or coding sequences that ensure that multiple bits change state between adjacent documents. Thus, it should be understood that the invention is not limited to the examples discussed in the specification. Rather, the present invention is intended to cover modifications and variations.

What is claimed is:

1. A method for validating the completeness of a document collation, comprising:
    obtaining information concerning a document collation having a first page and a last page;
    processing the obtained information; and,
    employing the processed information to apply a marking on the document collation, the marking readable through an enclosure that visually obscures the marking, the marking providing information regarding the completeness of the document collation when the document collation is within such an enclosure.

2. The method of claim 1, further comprising employing the processed information in a manner such that the applied marking comprises at least one of a first page mark on the first page of the document collation and a last page mark on the last page of the document collation.

3. The method of claim 2, further comprising employing the processed information to apply to the document collation a document collation piece identifier readable through an enclosure that visually obscures the document collation piece identifier.

4. The method of claim 2, wherein the document collation contains visually legible information, and wherein obtaining information concerning a document collation comprises scanning the document collation legible information to obtain information concerning the document collation.

5. The method of claim 2, wherein a storage medium contains a file in a storage location with stored information concerning the document, the document collation contains visually legible information, and wherein obtaining information concerning a document collation comprises scanning the document collation legible information to obtain file pointer information that points to the file location in the storage medium, and retrieving the stored information concerning the document collation from the file in the storage medium.

6. The method of claim 2, further comprising:
    inserting the document collation into an enclosure of the type that visually obscures the markings; and
    scanning the document collation marking within the enclosure to obtain information from the document marking.

7. The method of claim 6, further comprising processing the information obtained from the marking to validate the completeness of the document collation within the enclosure.

8. The method of claim 7, wherein a series of document collations are processed sequentially, and wherein employing the processed information to apply a marking on each document collation of the series of document collations comprises applying a sequence marking to each page of each document collation of the series of document collations and changing the sequence marking for adjacent document collations in the series of document collations, and wherein processing the information obtained from the marking comprises processing the obtained sequence marking information.

9. The method of claim 7, wherein a series of document collations are processed sequentially, each document collation of the series of document collations having a first page mark and a last page mark, and wherein adjacent document collations in the series of document collations each have a different predetermined first page zone where the first page mark is located, and have a different predetermined last page zone where the last page mark in located, and wherein processing the information obtained from the marking comprises determining the presence of marks on a document collation in different zones than the predetermined zones for the document collation to detect if different pages from adjacent document collations become intermixed and inserted into the enclosure.

10. The method of claim 7, further comprising:
moving enclosures with document collations that are validated as being complete to a first location; and
moving document collations that are not validated as being complete to a second location.

11. The method of claim 7, further comprising:
associating an enclosure with a document collation; and
marking the enclosure with an enclosure identification mark that is readable through an enclosure that visually obscures the enclosure mark.

12. The method of claim 6, wherein the first page mark is located within a predetermined first page mark zone on the document collation and the last page mark is located within a predetermined last page mark zone on the document collation.

13. The method of claim 12, wherein a series of document collations are processed sequentially, and further comprising applying the marking to each document collation of the series of document collations with a first page mark and a last page mark, and wherein adjacent document collations in the series of document collations each have a different predetermined first page zone where the first page mark is located and have a different predetermined last page zone where the last page mark in located.

14. The method of claim 13, wherein after a plurality of document collations in the series of document collations have been processed, a previously employed predetermined first page zone and a previously employed predetermined last page zone are reemployed such that adjacent document collations in the series of document collations each have a different predetermined first page zone and a different predetermined last page zone.

15. A system for validating the completeness of a document collation having a first page and a last page, the system comprising:
a scanner for scanning document pages to obtain information from visible markings on the document concerning the document collation;
a processor connected to the scanner and operable to process the information obtained from the visible markings to encode information for printing on the document collation in a magnetic ink;
a magnetic ink printer connected to the processor and operable to print encoded information on the document collation;
insertion processing equipment connected to receive the document collation with the encoded printed information for inserting the document collation with the encoded printed information into an envelope;
a magnetic ink scanner connected to receive and operable to scan envelopes having respective inserted document collations with the encoded printed information to retrieve the encoded information printed on each document collation; and,
a scan decode processor connected to the magnetic ink scanner and operable to decode the encoded information to determine if the document collation within the envelope contains a complete document collation.

16. The system of claim 15, wherein the scanner obtains information identifying the first page and the last page of the document collation, and the processor is operable to process obtained information from the visible markings to encode information identifying the first page and the last page of the document collation for printing on the document collation in a magnetic ink such that the applied marking includes a first page mark on the first page of the document collation and a last page mark on the last page of the document collation, and the scan decode processor is operable to decode the encoded information to determine if the document collation within the envelope contains only one first page and only one last page.

17. The system of claim 16, further comprising a diverter connected to the scan decode processor and operable to divert mailpieces in a stream of mailpieces to an out sort location, and wherein the scan decode processor operates to activate the diverter to divert mailpieces in the stream of mailpieces with document collations that have not been validated as complete.

18. A method for validating the completeness of a document collation having a first page and a last page, the method comprising:
scanning document pages to obtain information from visible markings on the document concerning the document collation;
processing the information obtained from the visible markings using a processor connected to the scanner to encode information for printing on the document collation in a magnetic ink;
printing encoded information on the document collation using a magnetic ink printer connected to the processor;
receiving the document collation with the encoded printed information in insertion processing equipment for inserting the document collation with the encoded printed information into an envelope;
scanning envelopes having respective inserted document collations with the encoded printed information using a magnetic ink scanner to retrieve the encoded information printed on each document collation; and,
decoding the encoded information using a scan decode processor connected to the magnetic ink scanner to determine if the document collation within the envelope contains a complete document collation.

* * * * *